United States Patent [19]
Kress

[11] 3,880,545
[45] Apr. 29, 1975

[54] FINE-BORING TOOL

[75] Inventor: Dieter Kress, Aalen, Germany

[73] Assignee: Mapal Fabrik fur Prazisionswerkzeuge Dr. Kress KG, Aalen, Germany

[22] Filed: Nov. 15, 1973

[21] Appl. No.: 415,992

[30] Foreign Application Priority Data
Nov. 27, 1972 Germany............... 2258062

[52] U.S. Cl. ............... 408/153; 408/185; 408/224
[51] Int. Cl. ............................................. B23b 29/02
[58] Field of Search .......... 408/181, 185, 153, 147, 408/189, 179, 224; 279/6

[56] References Cited
UNITED STATES PATENTS
3,490,315 1/1970 Melchiorre ....................... 408/153
3,598,499 8/1971 Dillon, Jr. ........................ 408/153

*Primary Examiner*—Gil Weidenfeld
*Attorney, Agent, or Firm*—Hans Berman

[57] ABSTRACT

A fine-boring tool in which a cutting blade is radially adjustable in an axial groove of the tool head, and guide rails axially elongated project radially from the tool head so that outer faces of the guide rails and a front portion of the cutting edge of the blade are located in a cylindrical surface about the axis of tool rotation while the rear portion of the blade projects radially beyond the afore-mentioned edge portion.

7 Claims, 3 Drawing Figures

FINE-BORING TOOL

This invention relates to boring tools, and particularly to a fine-boring tool for precision finishing a bore.

It is common practice to provide a boring bar with cutters or cutting blades adjustable radially relative to the longitudinal axis of relative rotation of the bar and workpiece, but such tools are not suited for precision finishing a bore, particularly if the latter varies in cross section along its length. It was conventional prior to this invention to use special tools for fine-boring. Such tools have a plurality of cutter blades shaped to conform to the bore to be finished and integral with or otherwise fixedly fastened to a carrier. When the blades need to be sharpened, their distance from the axis of tool rotation is reduced, and the permissible tolerance limits are reached after one or a few sharpening operations. The known fine-boring tools are not economical for mass production of objects having precisely dimensioned and contoured bores.

The primary object of the invention is the provision of a fine-boring tool which combines the advantages of the conventional boring bars having adjustable cutter blades with the precise centering required in fine-boring and not normally available from the conventional bars because of the deflecting forces acting on the tool.

With this object and others in view, as will presently become apparent, the invention provides a fine-boring tool in which the circumferential surface of the tool head is formed with a groove open in a radial direction relative to the axis of the head and elongated in the direction of the axis. A cutter blade is received in the groove and projects radially from the same. The effective depth of the groove may be adjusted for thereby adjusting the distance over which the blade projects from the groove. The tool is guided in the bore of a workpiece by guide members circumferentially spaced from each other and from the afore-mentioned groove on the surface of the tool head. Each guide member has an outer, convex guide face elongated in the directioon of the tool head axis, and the guide faces jointly define a cylinder about this axis.

Other features and many of the attendant advantages of this invention will readily be appreciated as the same becomes better understood by reference to the following detailed description of a preferred embodiment when considered in connection with the appended drawing in which.

Figure 1:
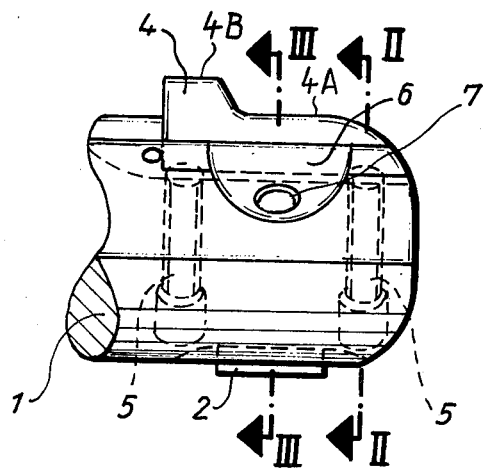
FIG. 1 shows a boring tool of the invention in fragmentary side elevation.
Figure 2:
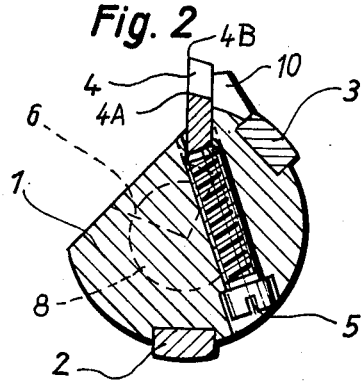
FIGS. 2 and 3 show the tool of FIG. 1 in front elevational sections on the lines II—II and III—III respectively.
Figure 3:
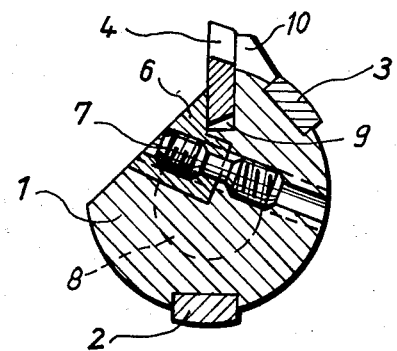

The head 1 of the illustrated boring tool has the approximate overall shape of a segment of a cylinder coaxial with the shaft 8, not seen in FIG. 1, on which the head 1 is fixedly mounted. The shaft may serve for rotating the head 1 about its axis.

Two identical guide rails 2, 3 are offset approximately 140° about the axis of the head 1. The rails 2, 3 are elongated in the direction of the axis, and their outer longitudinal faces are curved cylindrically about the axis. The faces are equidistant from the axis of the head 1 and thus are portions of a cylinder or cylindrical surface about the axis, the cylinder being uniquely defined by the faces of the guide rails 2, 3 and the axis. The rails 2, 3 are set in conforming shallow recesses of the head 1 so that they project radially beyond the circumferential surface of the head. They are secured in the grooves by solder, not visible on the scale of the drawing, so that they may be replaced readily by rails of greater or smaller height, or by rails of the same height after extended use.

Where the cylindrical and planar parts of the circumferential head surface meet, and approximately diametrically opposite the guide rails 2, an axially elongated groove 9 in the head 1 is open in an outward, radial direction. It conformingly receives a cutter blade 4. The effective depth of the groove 9 is determined by two adjusting screws 5 which project into the groove through opendings in its bottom wall and are threadedly received in bores of the head 1. The heads of the screws 5 are slotted to receive a screw driver and are readily accessible. The screws 5 provide abutments for the blade 4 which may be moved by means of a screw driver between an infinite number of positions in which they terminate at different respective distances from the bottom wall of the blade receiving groove 9. A radial, integral projection 10 of the head 1 backs the blade 4.

The cutting edge of the cutter blade 4 has a front portion 4A which is parallel to the axis of the head 1. When the blade 4 is properly adjusted by means of the screw 5, the portion 4A of the cutting blade is located in the cylindrical surface defined by the outer faces of the rails 2, 3. A rear portion 4B of the cutting edge is offset radially outwardly from the portion 4A in accordance with the shape of the bore which the illustrated tool is intended to finish. The front end of the edge slopes toward the axis.

The groove 9 is partly bounded by a movable clamping shoe portion 6 of the head 1 which is flush with the planar part of the circumferential head surface in the illustrated assembled condition of the tool. Aligned bores in the shoe 6 and in the body portion of the head 1 are partly threaded and receive a set screw 7 having right- and left-handed threads in the shoe 6 and in the body of the head 1 so that the width of the groove 9 may be set by means of a hexagonal wrench inserted in one end of the screw 7, and the adjusted width is maintained by friction in the engaged threads.

The mode of operation of the tool described above is inherent in its structure. The front end of the head 1 is inserted in a rough-bored opening having a cross section slightly smaller than that of the cylindrical surface defined by the guide rails 2, 3 and the cutting edge portion 4A. The tool and the workpiece are turned relative to each other about the axis of the head 1, as by rotating the shaft 8 while the workpiece stands still, or vice versa, and the workpiece and tool are axially moved toward each other so that the blade 4 enters the bore in the workpiece. The bore is enlarged gradually until the cutting edge portion 4A and the axially coextensive guide rails 2, 3 enter the bore and precisely center the tool while it further penetrates into the bore and ultimately shapes the walls of the bore to the contour defined by the rear portion 4B of the cutting edge. The rails 2, 3 burnish the cylindrical walls of the bore.

The tool of the invention has its most important present application in finishing bores which are partly cylindrical and partly shaped otherwise. It permits a large number of bores to be finished to the same exacting tolerances with a single cutter blade which may be reground whenever desired, and then precisely set to the original position of the cutting edge relative to the tool axis. Bores of very small diameter may thus be finished with great precision in long production runs at lower tool cost than was possible heretofore.

While the illustrated embodiment of the invention is presently preferred, modifications will readily suggest themselves. Thus, the cylinder surface mentioned which is essential for guiding the tool may be defined by outer convex guide faces of the rails 2, 3 which are not themselves parts of the cylinder, but may have a smaller radius of curvature than the cylinder defined. The adjusting screws 5 make it very easy to adjust the effective depth of the groove 9 with great precision, but shims inserted between the inner edge of the cutter blade 4 and the bottom wall of the groove 9 may be resorted to under some circumstamces.

Other changes are obviously possible without departing from the spirit and scope of the invention set forth in the appended claims since only a preferred embodiment has been illustrated.

What is claimed is:

1. A boring tool comprising:
 a. a tool head having an axis and a surface circumferentially extending about said axis,
  1. said surface being formed with a groove open in a direction radial relative to said axis and elongated in the direction of said axis;
 b. a cutter blade received in said groove and projecting radially from said groove,
  1. said blade having a cutting edge elongated in the direction of said axis, said cutting edge having two longitudinal portions;
 c. adjusting means for adjusting the effective depth of said groove and for thereby adjusting the distance over which said blade projects from said groove; and
 d. a plurality of guide means circumferentially spaced on said surface from each other and from said groove,
  1. each guide means including a guide member having an outer, convex guide face elongated in the direction of said axis,
  2. said guide faces and one of said longitudinal portions defining a cylinder about said axis,
  3. the other longitudinal portion of said cutting edge being offset radially from said cylinder.

2. A tool as set forth in claim 1, wherein said guide faces and said one portion constitute respective parts of said cylinder.

3. A tool as set forth in claim 1, further comprising a shaft coaxially projecting from said head in one axial direction, said one portion of said cutting head being offset from said other portion thereof in an axial direction opposite to said one axial direction.

4. A tool as set forth in claim 1, wherein said one portion of said cutting edge and said guide faces are axially at least partly coextensive.

5. A tool as set forth in claim 1, further comprising fastening means releasably fastening said blade in said groove.

6. A tool as set forth in claim 5, said head having an axially extending bottom wall in said groove, and said adjusting means including at least one abutment member movable on said head between a plurality of positions in which said abutment member terminates at different respective radial distances from said bottom wall in said groove.

7. A tool as set forth in claim 1, wherein said other longitudinal portion is offset from said cylinder in a radially outward direction.

* * * * *